United States Patent

[11] 3,581,931

| [72] | Inventor | Katsuro Yamamoto<br>Tokyo, Japan |
|------|----------|------|
| [21] | Appl. No | 879,841 |
| [22] | Filed | Nov. 25, 1969 |
| [45] | Patented | June 1, 1971 |
| [73] | Assignee | Bridgestone Liquefied Gas Company Limited<br>Tokyo, Japan |
| [32] | Priority | Nov. 30, 1968 |
| [33] | | Japan |
| [31] | | 87390/43 |

[54] STORAGE TANK OF COLD LIQUEFIED GAS
13 Claims, 3 Drawing Figs.

| [52] | U.S. Cl. | 220/9LG |
|------|----------|---------|
| [51] | Int. Cl. | B65d 25/18 |
| [50] | Field of Search | 220/9 LG, 10; 52/249, 405 |

[56] References Cited
UNITED STATES PATENTS

| 1,993,500 | 3/1935 | Benner | 52/249X |
| 3,076,317 | 2/1963 | La Fave | 52/249X |
| 3,338,010 | 8/1967 | Waugh | 52/249 |
| 3,514,913 | 6/1970 | Nelson | 52/249 |

FOREIGN PATENTS

| 1,911,115 | 10/1969 | Germany | 52/405 |
| 976,198 | 11/1964 | Great Britain | 220/9LG |

*Primary Examiner*—Allen N. Knowles
*Attorney*—Fleit, Gipple & Jacobson

ABSTRACT: A storage tank of cold liquefied gas, which comprises an outer shell, an inner membrane tank, and a heat-insulating layer inserted between the outer shell and the inner membrane tank. The heat-insulating layer consists of a body made of first material and blocks made of second material buried in the body. Thereby, excellent mechanical strength and heat insulation can be achieved with a comparatively thin heat-insulating layer.

INVENTOR
KATSURO YAMAMOTO

PATENTED JUN 1 1971

INVENTOR

KATSURO YAMAMOTO

BY Fleit, Gipple & Jacobson
ATTORNEYS

STORAGE TANK OF COLD LIQUEFIED GAS

This invention relates to a storage tank of cold liquefied gas, and more particularly to a storage tank, which comprises sturdy outer shell withstanding high pressure, a heat-insulating layer lined on the inner surface of the outer shell, and an inner tank made of thin plate, that is membrane, disposed in the outer shell and adapted to be readily expended by the internal pressure thereof, whereby the wall of the inner tank is urged against the insulating layer so as to transmit the internal pressure through the heat-insulating layer to the outer shell which bears the internal pressure.

Generally speaking, in a storage tank including an outer shell and an inner membrane tank with a heat-insulating layer inserted therebetween, the heat-insulating layer should have high mechanical strength in addition to its inherent low heat conductivity. The mechanical strength and the heat-insulating ability of heat-insulating material are, however, usually incompatible with each other; namely, in most heat-insulating material, if the heat insulation is high, its mechanical strength is low, or if the mechanical strength is high, its heat insulation is low. Known storage tanks of membrane structure have shortcoming in that they are expensive, because costly heat insulating material is utilized, such as synthetic resin like foamed hard polyurethane and foamed hard vinyl chloride, and special wood like balsa.

Therefore, an object of the present invention is to provide a storage tank of membrane type for storing cold liquified gas, which obviates the aforesaid difficulty of known storage tanks of the like structure. Instead of searching for heat-insulating material having both high heat insulation and high mechanical strength, the invertor has succeeded in devising a special heat-insulating layer consisting of a first material with high heat insulation and a second material with high mechanical strength, which first and second materials are disposed in certain geometrical relations with each other. Thereby, an economical heat-insulating layer is provided, which satisfies all the requirements necessary for a proper membrane-type storage tank of cold liquefied gas.

According to the present invention, there is provided a storage tank of cold liquefied gas having an outer shell, an inner membrane tank, and a heat-insulating layer disposed between the outer shell and the inner tank, characterized in that the heat-insulating layer consists of a body made of first heat-insulating material with high compression resistivity, e.g. foamed concrete, a plurality of blocks made of second heat-insulating material buried in the body, and a protective screenlike member buried in the body in the proximity of the inner surface thereof, said second heat-insulating material having heat conductivity and compression resistivity which are both lower than those of said first heat-insulating material.

For a better understanding of the invention, reference is made to the accompanying drawings, in which.

Like parts are designated by like numerals throughout the drawings.

Figure 1:
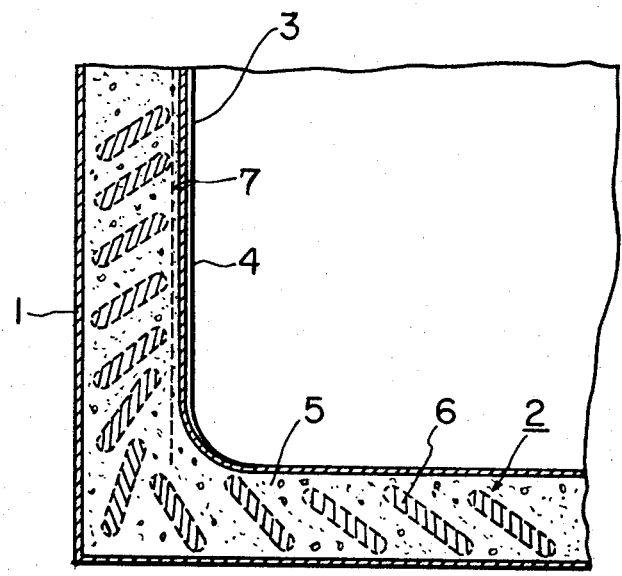
FIG. 1 is a partial sectional view of a storage tank of cold liquefied gas, embodying the present invention.

Referring to FIG. 1, illustrating the structure of a part of the sidewall and the bottom wall of a storage tank according to the present invention, an outer shell 1 is made of sturdy material capable of withstanding high stress, and a heat-insulating layer 2 lined on the inside surface of the outer shell 1. An inside membrane tank 3 is disposed inside the outer shell 1 so as to sandwich the heat insulating layer 2 by the walls of the outer shell 1 and the inner membrane tank 3. The inner membrane tank 3 is, for instance, made of 2 to 3 mm. thick metallic plate, and it cannot withstand by itself the high internal pressure of fluid substance to be stored therein. In response to the high internal pressure of the storage tank, the inner membrane tank 3 flexes and is urged against the heat-insulating layer 2 which receives the internal pressure. The internal pressure is then transferred to the outer shell 1 through the heat-insulating layer 2, so that the outer shell 1 can bear the internal pressure of the storage tank. Corrugations 4 are formed on the wall of the inner membrane tank 3, to provide for flexibility and thermal expansion and contraction of the wall. The outer shell is made of concrete or metallic material so as to ensure high mechanical strength sufficient for withstanding the internal pressure of the storage tank.

In the storage tank with the inner membrane tank of the aforesaid structure, the heat-insulating layer 2 is required to have not only a low heat conductivity, but also a high resistance against compression caused by the internal pressure of the tank. Comparatively expensive materials have been used in the heat-insulating layer of conventional storage tanks of this type. The present invention is featured in that a heat-insulating layer having both high compression resistivity and low heat conductivity is provided without using any expensive material.

Referring to FIG. 1, the heat insulating layer 2 of the present invention consists a body 5 made of first heat-insulating material and a plurality of blocks 6 made of second heat-insulating material. The first heat-insulating material for the body 5 has high compression resistivity, but its heat conductivity can be comparatively high. Examples of the first heat insulating material are foamed concrete and pearlite concrete. Such material for the body 5 is comparatively cheap and can easily be prepared and shaped, as in the case of pearlite concrete. Foamed concrete and pearlite concrete also have excellent refractory characteristics. However, due to the comparatively high heat conductivity, if the heat-insulating layer 2 is formed solely by the first heat-insulating material, e.g., foamed concrete or pearlite concrete, it becomes too thick, so that available volume of the storage tank becomes small for the amount of materials used therefor.

Contrary to the first heat-insulating material, the second heat-insulating material for the blocks 6 has low heat conductivity, but its mechanical strength is low. In the embodiment of FIG. 1, the blocks 6 are in the form of a plurality of cylinders which are disposed in the body 5 in certain angular relations with the walls of the outer shell 1 and the inner membrane tank 3. The cylindrical blocks 6 of the embodiment of FIG. 1 can be embedded in the body 5 when pouring foamed concrete or pearlite concrete to form the body. In other words, the cylindrical blocks 6 are at first disposed in a mold of the body 5, and then the first heat-insulating material, e.g., foamed or pearlite concrete, is poured into the mold, to complete the heat insulating layer 2.

With the heat-insulating layer 2 of the aforesaid construction, according to the present invention, the mechanical compression is fully borne by the body 5 made of the first heat-insulating material, while the blocks 6 made of the second heat-insulating material act to lower the overall heat conductivity of the heat-insulating layer 2 to a desired level. As a result, the desired low heat conductivity can be achieved by a comparatively thin heat-insulating layer 2, due to the existence of the blocks 6 therein. In practice, the mechanical strength of the body 5 should preferably be so designed that the full compressive load on the heat insulating layer 2 can be borne solely by the body 5, even if the blocks 6 are vacant, i.e., made of air, instead of solid material.

In order to prevent the inner surface of the heat-insulating layer 2 from crumbling or falling down, a screenlike member 7 is buried in the layer 2 in the proximity of its inner surface. When the body 5 of the heat-insulating layer 2 is made of foamed concrete or pearlite concrete, the inner surface of such concrete body is prone to crumble. A screenlike member 7, such as a metallic screen which is disposed in the proximity of the inner surface of the heat-insulating layer 2, acts to keep the integrity of the heat-insulating layer 2 by preventing the falling of the innermost surface of the body 5 thereof.

Figure 2:
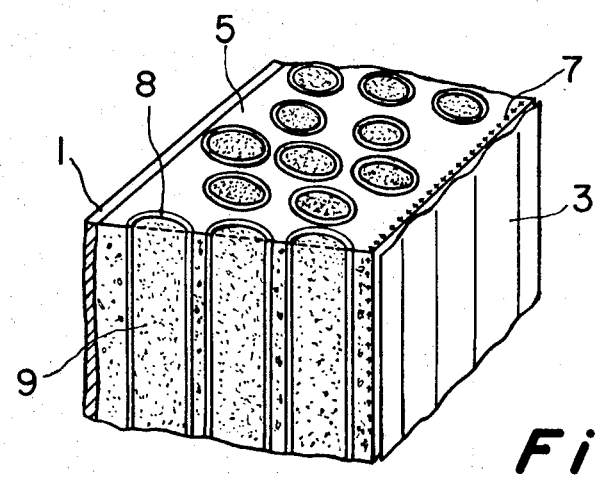
FIG. 2 is a schematic view of the heat-insulating wall of a storage tank, according to the present invention.

Various heat-insulating substances can be used as the second heat-insulating material for the blocks 6, because the blocks 6 need not have substantial mechanical strength. In the embodiment of FIG. 2, each of the blocks 6 consists of a hollow cylinder 8 made of cardboard and pearlite powder 9 filled in the hollow space of the cardboard cylinder. In other words, the second heat-insulating material for the blocks 6 in this embodiment includes cardboard and pearlite powder. Instead of being cylindrical, each of the blocks 6 can be made in the form of an elongated flattened plate with a substantially rectangular cross section.

Figure 3:
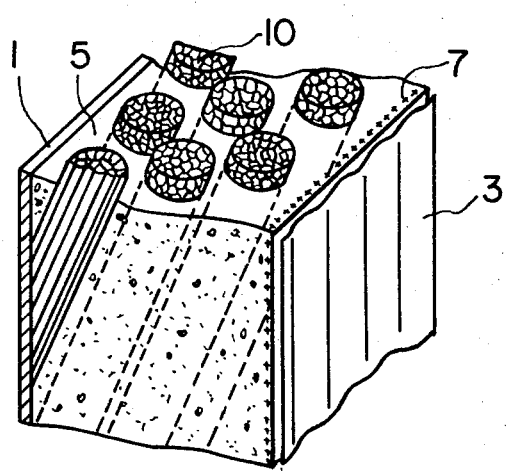
FIG. 3 is a view similar to FIG. 2, illustrating a different construction of the heat insulating wall of a storage tank of the invention.

In another embodiment of the invention, as shown in FIG. 3, each of the blocks 6 consists of a plurality of cylindrically shaped polystyrene foam. As pointed out above, the cardboard cylinders 8 filled with pearlite powder 9 and the cylindrically shaped polystyrene foam blocks 10 can be disposed in the body 5 before the first heat-insulating material, e.g., foamed concrete, is poured to form the body 5.

As can be seen from FIGS. 1 to 3, the blocks 6 made of the second heat insulating material can be disposed in any angular relation with the walls of the outer shell 1 or the inner membrane tank 3. It is preferable to dispose the blocks 6 in the heat-insulating layer 2 in such manner that all the normal lines extending inwardly from the outer shell 1 intersect with at least one of the blocks 6 made of the second heat-insulating material, before reaching the wall of the inner membrane tank 3 disposed at the opposite surface of the heat insulating layer 2.

As suggested in the foregoing disclosure, the second heat-insulating material for the blocks 6 need not be solid material, but it can be fluid, such as air. If the second heat-insulating material is air, the blocks 6 become cavities, which are intentionally formed in the heat-insulating layer 2. The size and the shape of such cavities are preferably such that the entrapped air therein would be prevented from convection. If the inside space of such blocks 6 are evacuated, the overall heat conductivity of the heat-insulating layer 2 can be further improved. In the specification, the term "block" includes such an evacuated space.

Thus, according to the present invention, a highly reliable storage tank for cold liquefied gas can economically be provided, which includes a comparatively thin heat-insulating layer with excellent heat-insulating ability while maintaining high mechanical strength. The heat-insulating layer of the storage tank of the present invention can be manufactured at low cost by simple process, yet it has excellent refractory characteristics, in addition to the low heat conductivity and the high mechanical strength.

What I claim is:

1. A storage tank of cold liquified gas, comprising an outer shell, an inner membrane tank, and a heat-insulating layer consisting of a body made of first heat-insulating material with high compression resistivity, a plurality of blocks made of second heat-insulating material being buried in the body, and a protective screenlike member buried in the body in the proximity of the inner surface thereof, said second heat-insulating material having heat conductivity and compression resistivity which are both lower than those of said first heat-insulating material.

2. A storage tank according to claim 1, wherein said blocks made of the second heat-insulating material are so disposed in the body of the heat-insulating layer that no heat leaks through the heat-insulating layer along a rectilinear path, which is normal to the wall of the outer shell, without encountering at least one of said blocks.

3. A storage tank according to claim 1, wherein each of the blocks of the heat-insulating layer is an elongated flattened plate with a substantially rectangular cross section.

4. A storage tank according to claim 1, wherein said blocks of the heat-insulating layer are in the form a plurality of cylinders made of the second heat-insulating material buried in the body.

5. A storage tank according to claim 4, wherein said cylindrical blocks of the heat-insulating layer are disposed in parallel with the wall of the outer shell.

6. A storage tank according to claim 1, wherein said body of the heat-insulating layer is made of foamed concrete.

7. A storage tank according to claim 1, wherein said body of the heat-insulating layer is made of pearlite concrete.

8. A storage tank according to claim 1, wherein each of said blocks of the heat-insulating layer consists of a cylinder made of cardboard and pearlite powder filling up the cylinder.

9. A storage tank according to claim 1, wherein the second heat-insulating material for the blocks of the heat-insulating layer is polystyrene foam.

10. A storage tank according to claim 1, wherein the second heat-insulating material for the blocks of the heat-insulating layer is air.

11. A storage tank according to claim 1, wherein said blocks in the body of the heat-insulating layer consist of evacuated cavities.

12. A storage tank according to claim 1, wherein said inner membrane tank consists of corrugated metal sheets being contiguous to the inner surface of the body of the heat-insulating layer.

13. A storage tank according to claim 1, wherein said protective screenlike member in the heat-insulating layer is a metallic screen.